May 21, 1957   S. G. DEAVES   2,793,150
CONVEYOR BELTS
Filed Dec. 3, 1952
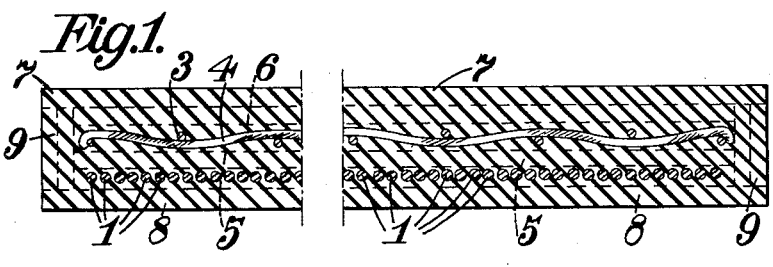
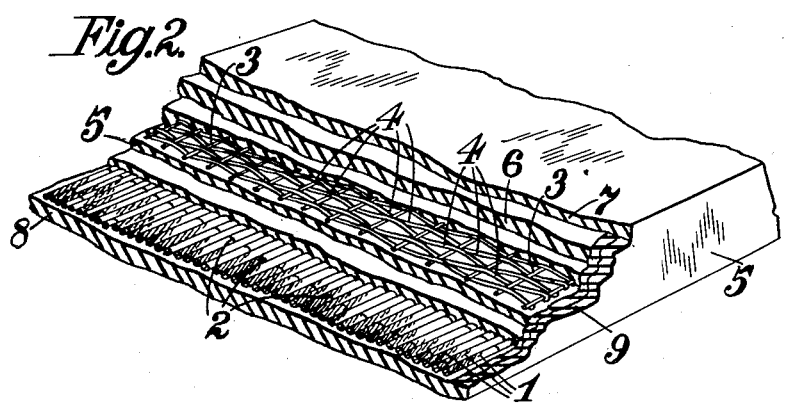
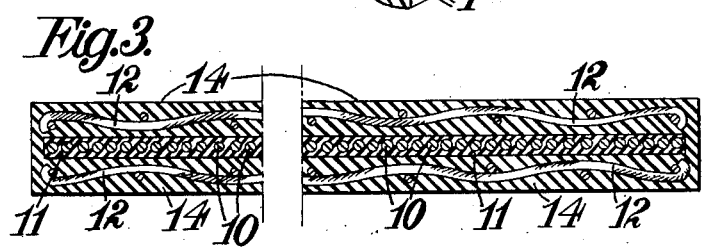
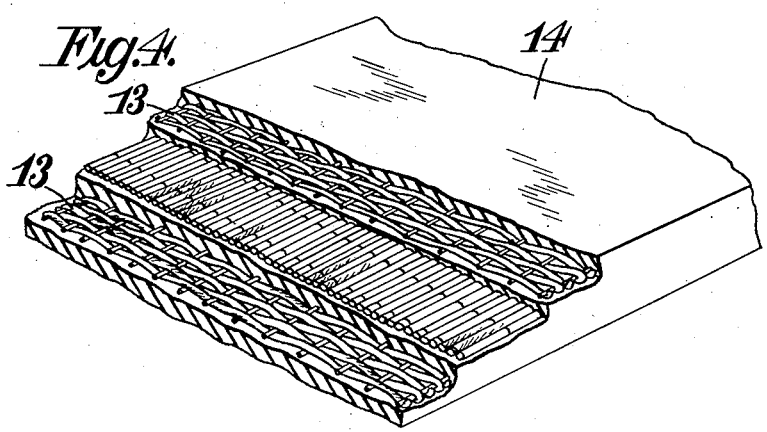

United States Patent Office 2,793,150
Patented May 21, 1957

2,793,150
CONVEYOR BELTS

Stanley George Deaves, London, England, assignor to The British Tyre & Rubber Company Limited, London, England, a British company Application December 3, 1952, Serial No. 323,825

Claims priority, application Great Britain December 6, 1951

1 Claim. (Cl. 154—52.1)

The invention relates to conveyor belts.

Conveyor belts as hitherto constructed incorporate vegetable textile threads or material woven from such threads either as a main reinforcement or as a subsidiary to a main reinforcement of longitudinally extending multi-strand wires or cables, the textile material in the latter case providing the major portion of the lateral strength of the belt, and the whole in either construction being covered with rubber or the equivalent. A disadvantage of such belts is that when worn so as to expose the textile material and the textile material is subjected to severe friction, the textile material may ignite. This is particularly disadvantageous when such belts are used in underground and similar conditions.

According to the invention a conveyor belt comprises a body portion of rubber having embedded therein a reinforcement of longitudinally extending flexible wires or cables, and on one or both sides of such reinforcement one or more plies of a woven metal fabric providing the lateral strength of the belt.

Two specific examples of conveyor belts according to the invention as shown in the drawings will now be described.

In the drawings:

Figure 1 is a section through one of the belts, the several layers used in the production of the belt being indicated by chain lines;

Figure 2 is a perspective view of a portion of the belt shown in Figure 1 with the several layers cut away in steps, and Figures 3 and 4 are views similar to Figures 1 and 2 of the other of the belts.

In the belt shown in Figures 1 and 2 there are longitudinally extending wires 1 with 20 ends per inch across the belt. The wires are 7/3/0.006 inch steel wire cord, brass plated and finished with a coating of cumar resin, the numerical symbol designating that the cord is made by twisting together seven individual multistrand cables each containing three strands of 0.006 inch diameter. The wires are 165 lbs. tensile. The wires are initially held in place by textile weft threads 2, there being two threads per inch.

The lateral strength of the belt is provided by a woven wire mesh having 2–8 ends per inch x 12.5 picks per inch i. e., there are from 2 to 8 warp wires per inch and about 12.5 weft wires per inch. The weave is plain with loop selvedges extending longitudinally of the belt.

The warp wires 3 are 27 s mild steel wire (27 tons steel) i. e., they have a diameter of 0.016 in. and a breaking load of 12.7 lbs.

The weft wires 4 are 7/3/0.0058 ins. wire cord (150 lbs. tensile), the numerical symbol designating that the weft wires 4 are made by twisting together 7 individual multistrand cables each containing 3 strands of 0.0058 inch diameter.

The warp and the weft wires have a cumar resin finish.

In the building of the belt the longitudinal wires are insulated, like a tyre cord, with rubber or like material, to give an overall gauge of 1/16 inch, a layer 5 of 1/16 inch thick rubber is laid on top of the wires and on top of this is laid the wire mesh 3, 4. A further layer of rubber 6 is laid on top of the mesh and the top and back wearing covers 7 and 8 are applied with double thickness of material at the edges 9. The whole is then vulcanised.

In the belt shown in Figures 3 and 4 there are longitudinally extending brass-plated steel wires 10 as in the previous example, the wires being embedded in rubber 11. On each face of the rubber covered core so produced there is a ply of woven brass-plated wire mesh 12 which may also be coated with rubber. The mesh is of highly flexible wire and is woven with selvedge eyes 13 extending longitudinally of the belt. The wires of the mesh extend longitudinally and transversely of the belt. Coverings of rubber 14 are applied on both sides and the edges and the whole is vulcanised under pressure.

A weak weft of about two threads per inch is used to hold the longitudinally extending wires of the reinforcement in position before the rubber is applied, and, as in the previous examples, this comprises the only textile material in the belt. If desired these threads may be replaced by fine wire.

Throughout this specification the term "rubber" is used to mean rubber in natural or synthetic form or similar plastic material such as polyvinyl-chloride.

I claim:

A conveyor belt comprising a thin flat rubber body having parallel faces on opposite sides thereof, a plurality of flexible mutually parallel multi-strand metal cables extending in closely spaced relation longitudinally through said rubber body, each cable being surrounded by and adhered to said rubber body, and between one of said faces and said longitudinal cables a straight laid square-woven metal fabric ply impregnated with and insulated by rubber of said body from said longitudinal cables, said metal fabric ply having flexible wire warp members extending longitudinally of the body and a plurality of multi-strand metal cable weft members of appreciably greater tensile strength than said wire warp members extending transversely of the body to reinforce said body against lateral stretching.

References Cited in the file of this patent

UNITED STATES PATENTS

| | | |
|---|---|---|
| 1,931,309 | Thompson | Oct. 17, 1933 |
| 2,114,517 | Apel et al. | Apr. 19, 1938 |
| 2,461,654 | Nassimbene | Feb. 15, 1949 |
| 2,515,778 | Knowland | July 18, 1950 |
| 2,526,324 | Bloomfield | Oct. 17, 1950 |
| 2,538,414 | Crosby | Jan. 16, 1951 |